UNITED STATES PATENT OFFICE.

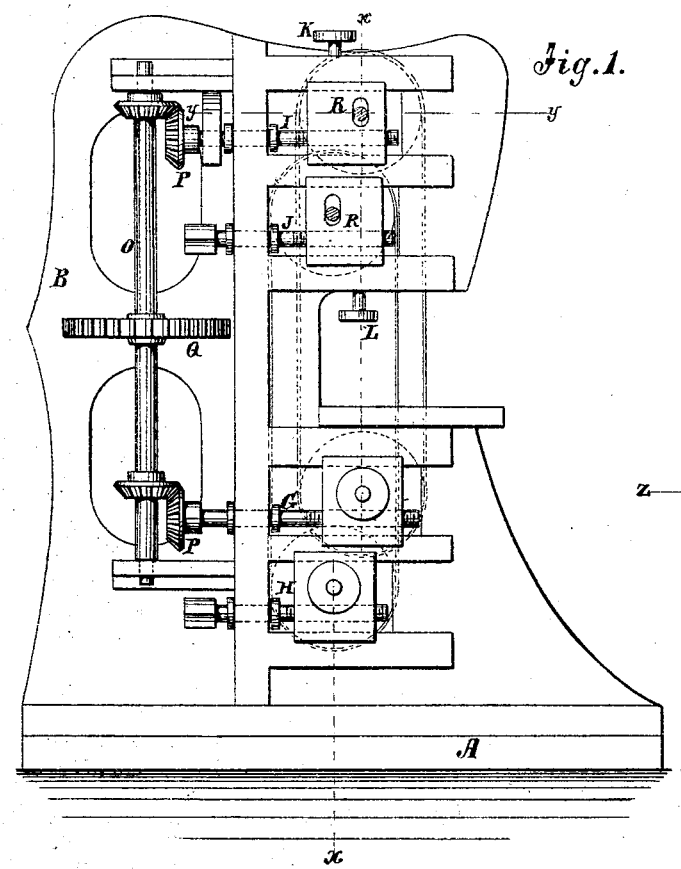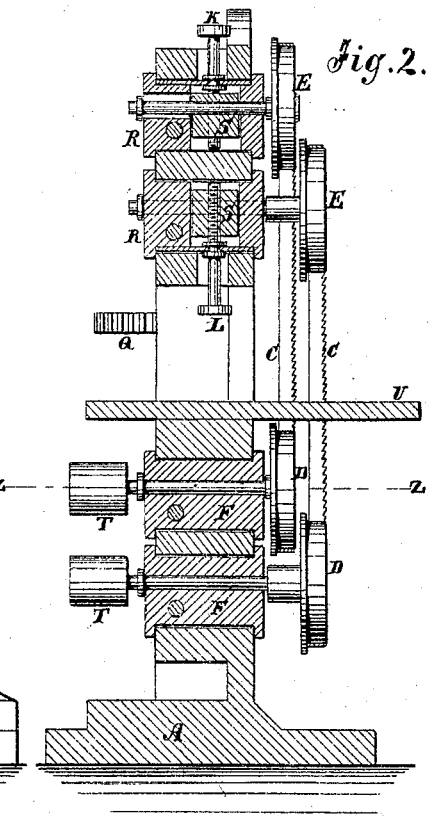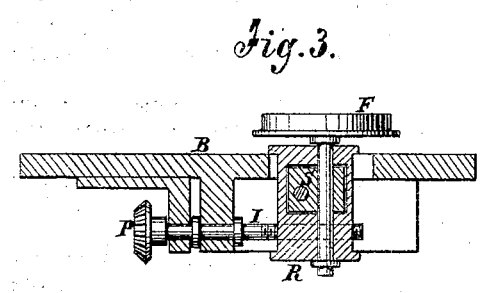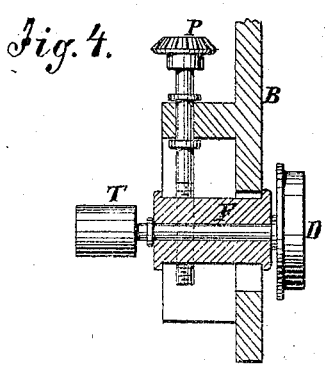

HENRY SILLMAN, OF BROOKLYN, NEW YORK.

IMPROVEMENT IN BAND-SAW GANGS.

Specification forming part of Letters Patent No. 135,164, dated January 21, 1873.

*To all whom it may concern:*

Be it known that I, HENRY SILLMAN, of Brooklyn, in the county of Kings and State of New York, have invented a new and useful Improvement in Band-Saw Gangs, of which the following is a specification:

This invention has particular reference to the mode of adjusting the saws of band-saw gangs, which will be hereinafter more fully described and then pointed out in the claim.

In the accompanying drawing, Figure 1 represents a side elevation. Fig. 2 is a vertical section of Fig. 1 taken on the line $x\,x$. Fig. 3 is a horizontal section of Fig. 1 taken on the line $y\,y$. Fig. 4 is a horizontal section of Fig. 2 taken on the line $z\,z$.

Similar letters of reference indicate corresponding parts.

A is the bed-plate. B is an upright stand, of irregular form, with which the entire apparatus is connected. C C represent the saws, more or less in number, as may be desired, which pass under the two driving-pulleys D D and over the two upper pulleys E E, as seen in the drawing. The shafts of the pulleys D D pass through the boxes F F, which are made adjustable laterally by means of screws G H. The upper pulleys are adjusted both laterally and vertically, the former being done by the screws I J, and the latter by the screw K at the top of the frame, and the screw L at the bottom, as seen in Fig. 1. The pulleys of the upper saw are moved laterally simultaneously by means of miter-gearing on the vertical shaft O engaging with the cog, miter, or bevel-wheels P P on the pulley-shafts G and I. Q represents a band-wheel, by means of which the shaft O is turned. The two upper pulley-boxes R R are double, the vertical adjustment of these shafts being governed by the interior boxes S S, which slide up and down in the boxes R R, which latter are slotted to allow the pulley-shafts a vertical movement, as shown in Fig. 2. By this vertical adjustment the band-saws are strained separately, and by the lateral movement the saws are adjusted nearer together or further apart, so as to saw material of different thickness. The pulleys of the lower saw are adjusted laterally, separately, so that it may be set to saw on a bevel with the bed U, while the other saw cuts at a right angle with the bed. Other saws may be added and operated in the same manner. The pulleys which carry the lower saws lap on to pulleys of the upper saw, as seen in Fig. 2.

The arrangement of the saws on separate pulleys, having separate and independent shafts, allows them to be strained and adjusted separately, to suit the various purposes to which they may be applied. These saws are constructed either with or without teeth, to adapt them for sawing either wood or stone.

The saws are driven by means of belts on the pulleys T T, from the drum of the engine or other motive power.

Having thus described my invention, I claim as new and desire to secure by Letters Patent—

1. The double boxes R S, adjusting-screws K L, gear-wheels P P, and vertical shaft and gears O, by means of which the saws are strained and one of them adjusted laterally, substantially as shown and described, for the purposes set forth.

2. The pulleys D D and E E, arranged as shown and described, to adapt them for operating saws C C of equal length.

HENRY SILLMAN.

Witnesses:
T. B. MOSHER,
W. A. GRAHAM.